United States Patent [19]

Duveau

[11] 4,003,398
[45] Jan. 18, 1977

[54] PRESSURE LIMITER DEVICE

[76] Inventor: Francois Duveau, 74 Rue de Normandie, Courbevoie, France, 92400

[22] Filed: Mar. 17, 1975

[21] Appl. No.: 558,957

[30] Foreign Application Priority Data
  Jan. 21, 1974   France .............................. 74.09653

[52] U.S. Cl. .............................. 137/512; 137/493; 137/845
[51] Int. Cl.² ........................................ F16K 15/14
[58] Field of Search .............. 138/44, 45; 137/512, 137/493, 525, 525.1, 493.9, 218

[56] References Cited
UNITED STATES PATENTS

| | | | |
|---|---|---|---|
| 2,941,544 | 6/1960 | Peras | 137/525.1 X |
| 3,007,527 | 11/1961 | Nelson | 137/525.1 X |
| 3,023,767 | 3/1962 | Woodford | 137/218 |
| 3,151,626 | 10/1964 | Everett | 137/493 |
| 3,159,175 | 12/1964 | MacMillan | 137/493 |
| 3,186,643 | 6/1965 | George et al. | 137/218 X |
| 3,303,800 | 2/1967 | Young | 137/218 X |
| 3,696,958 | 10/1972 | Lee | 138/45 X |
| 3,811,466 | 5/1974 | Ohringer | 137/493 |

FOREIGN PATENTS OR APPLICATIONS 966,137   8/1964   United Kingdom .............. 137/493

*Primary Examiner*—Robert G. Nilson

[57] ABSTRACT

A pressure limiting device for protecting a fluid pressure circuit involves a stack of elastomeric washers, and each of the washers has a slit through which fluid can bleed to reduce the fluid pressure below a critical value; the slits are normally closed and so prevent substantial fluid flow, but are able to open to pass fluid when the pressure reaches a critical value at which the pressure distorts the stack of washers.

12 Claims, 4 Drawing Figures

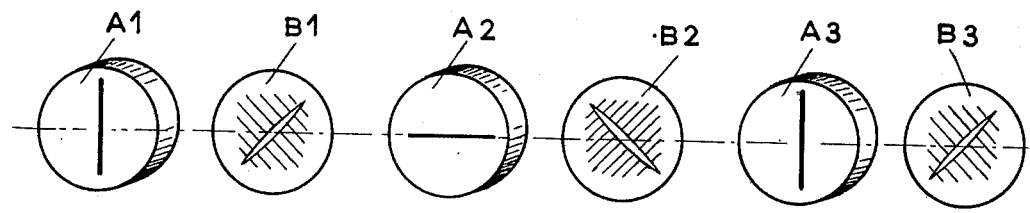
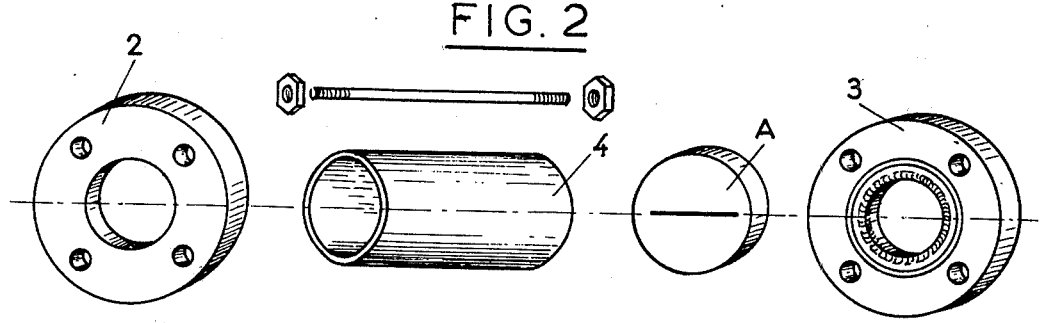
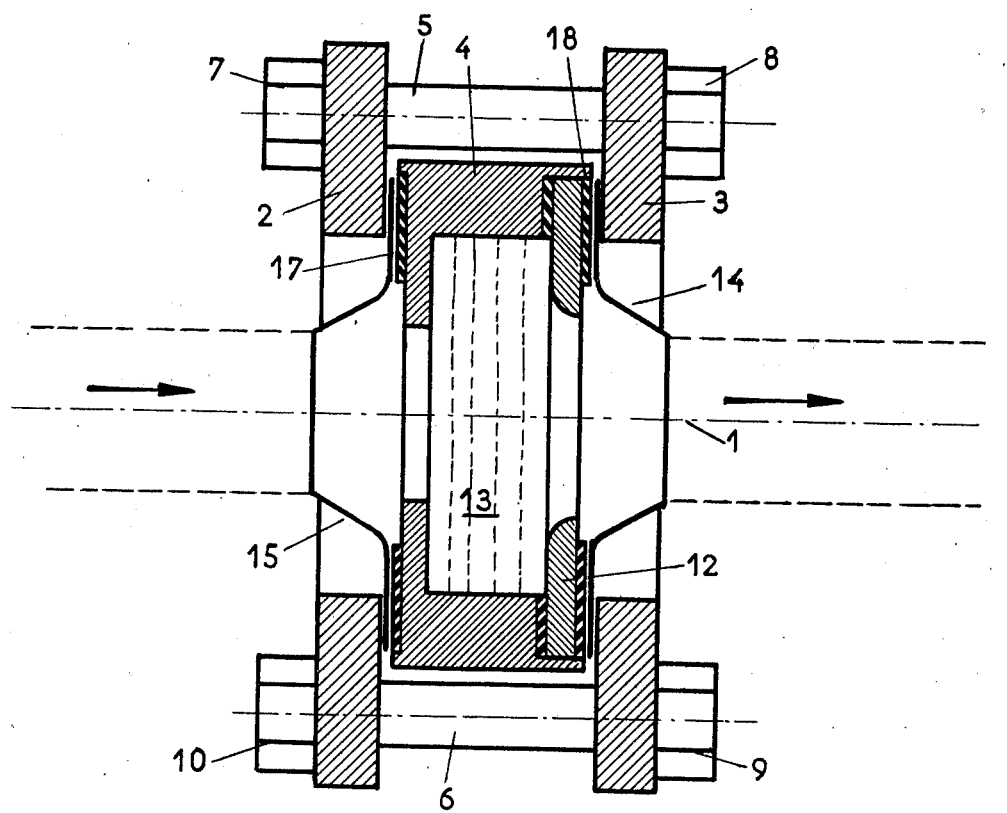

PRESSURE LIMITER DEVICE

BACKGROUND OF THE INVENTION

1. Field of the Invention

The present invention relates generally to hydraulic circuit elements which are designed to permit fluid flow when the pressure in an enclosure or downstream of a pump exceeds a predetermined level. The permitted flow of fluid may be directed towards a reservoir or to a point upstream of the supply. Such elements are called safety valves when they act to protect an enclosure, and pressure relief valves when they act to protect a circuit.

2. Description of the Prior Art

Pressure sensitive protective devices for hydraulic circuit elements have hitherto been designed in the form of mechanical devices. The simplest, for example ball-valves, are the least reliable. At high pressures, ball valves are generally the source of dangerous vibration and have to be equipped with hydraulic dampers, which of course increases the cost of the valves undesirably.

Such mechanical devices also suffer from the drawback that they exhibit appreciable variations in their flow pressures.

To reduce pressure variation as a function of flow, pressure-relief valves of the piston spool type have been designed. For high flow rates relief valves using pilot valves have also been designed. However, such valves are expensive and suffer from spring wear or wear on the part of gaiters surrounding their springs.

The prior art protective elements briefly discussed above are convenient enough when used in circuits involving the transfer of water or non-corrosive liquids. However, this is not the case in the chemical industry where corrosive materials may be handled. Even more expensive solutions to the protection problem have had to be resorted to by reason of the mandatory use of special corrosion-resistant metals and in certain cases, precious metals.

Hydraulic pressure limiters are known which operate using elastic obturator devices, and in which the obturator elements themselves furnish the elastic reaction. Such obturator elements have not found significant favour in industry since they are either too thick and insufficiently sensitive, or are too thin and unreliable.

SUMMARY OF THE INVENTION

According to the present invention, there is provided a fluid pressure limiter incorporating an elastically-operable obturator in which the body of the obturator furnishes the elastic reaction. An obturator in accordance with the present invention comprises a stack of washers made of a natural or artificial resilient material. The central part of each washer has a slit, the lips of which are normally closed, which can open to permit fluid flow as the washer distorts under the effect of an applied fluid pressure.

Desirably, the slits or slots in two hydraulically adjacent control washers will make an angle with one another, this angle preferably being a right angle. Preferably, too, between each pair of neighbouring washers there is interposed a washer or shim of a suitable low-friction material. The intermediate washers or shims may be freely notched in order not to present any obstacle to the free circulation of liquid which has passed through an upstream washer.

Preferably, the resilient control washers are made from a natural or artificial rubber having high resilience and accordingly containing little or no fillers, the rubber furthermore being resistant to chemical attack by the fluid whose pressure the device is to control.

The intermediate washers or shims must have the same resistance to chemical attack and should have a coefficient of friction of the same order as that of the synthetic material known by the trade name Teflon (polytetrafluoroethylene).

The stack of washers; i.e., the elastically-operable obturator of the present invention; is preferably utilised by arranging it in a housing connected to the piping downstream of a pump, the housing being provided with two connection orifices located opposite one another in two mutually parallel end faces of the housing. Advantageously, the housing is equipped with a preferably adjustable or interchangeable member which compresses the periphery of the washers over an annular surface area the magnitude of which can be modified by adjusting or interchanging the said member.

The pressure limiters in accordance with the invention will advantageously be utilised in association with positive displacement pumps or semi-positive displacement pumps of the kind known as ring pumps. The limiters can also be used with centrifugal pumps especially if the control pressure is in a zone of instability.

It has been found that the present pressure limiters have no tendency towards vibration. It will be appreciated that the designer has at his disposal a large number of variables which can be selected as required to determine the operating characteristics of the limiter to be developed. The variables from which a selection can be made include (i) choice of the material for the main control washers; (ii) choice of the material for the separating washers; (iii) thickness of the washers; (iv) number of washers in a stack; and (v) compression area at the peripheral zone of the annular faces.

Operation of the device is readily explained by the enlargement of the slits or slots due to the distortion of the resilient washers under the action of pressure variations. Self-evidently, for zero or near zero pressure, there will still be a thin central leakage space of an order of magnitude which is encountered in some mechanical designs. The pressure limiter described is not restricted to use in limiting the load on a hydraulic circuit. Amongst other possible applications, the present invention can be utilised to constitute or form part of a piston which itself could be designed to limit the maximum operating pressure of a fluid pressure circuit containing the piston.

BRIEF DESCRIPTION OF THE DRAWING

The invention will now be described in more detail by way of example only with reference to the accompanying drawings, in which:

FIG. 1 is an exploded schematic view illustrating a stack of washers for a pressure limiter embodying the invention;

FIG. 2 is a schematic exploded view illustrating in perspective a pressure limiter embodying the invention, the stack of washers having been represented symbolically by a single element;

FIG. 3 is an axial schematic section through a pressure limiter forming another embodiment of the invention, assembled in a pipeline.

DESCRIPTION OF THE PREFERRED EMBODIMENTS

Figure 4:
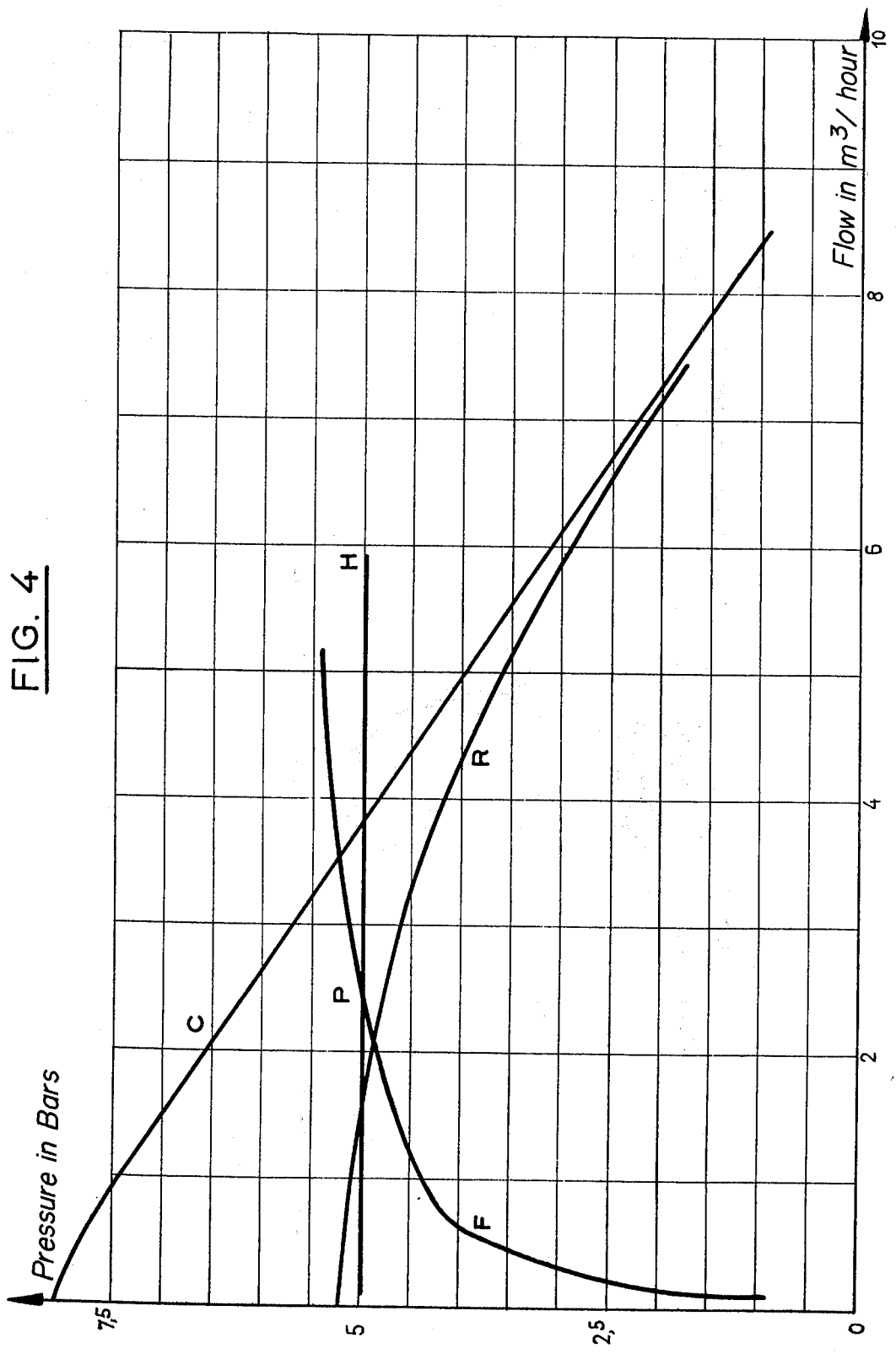
FIG. 4 illustrates graphs of pressure against flow rate for the guidance of the designer.

In FIG. 1, a plurality of resilient pressure control washers A1, A2, A3, belonging to a stack A1, A2 . . . A$n$, is shown together with separator washers B1, B2, B3, of a stack B1, B2 . . . B$n$−1. The two sets of washers are interleaved such that the A and B washers alternate, as shown.

Each of the washers A, B is provided with a slit or slot. It will be seen that the slots in two hydraulically adjacent resilient washers A2 and A3, for example, are arranged at right angles to one another. Similarly, the slots in the two separator washers B2, B3 are arranged at right angles to one another and at 45° to the slots in the immediately adjacent main control washers A2, A3.

The resilient washers A are made from an elastomeric material such as, for example, natural or synthetic rubber. The washers B, which can be in the form of shims, have a low coefficient of friction and are made from polytetrafluoroethylene in these examples.

Two examples of pressure limiters embodying the invention are shown in FIGS. 2 and 3.

The device shown in FIG. 2 comprises two centrally-apertured discs 2, 3, a body consisting of a spacer tube 4, the washer stack A and a plurality of nuts and bolts. When the device is assembled and bolted tightly together, the washer stack is compressed between one end of the tube 4 and the disc 3. The other end of the tube 4 is held in abutment with the other disc 2. Seals, not shown, are provided to render the assembly fluid-tight. The discs 2 and 3 can, if desired, comprise end flanges fitted to adjacent ends of the two pipes of a piping system in which the device is installed.

The pressure limiting device 1 shown in FIG. 3 is of rather different design compared to the embodiment of FIG. 2. The FIG. 3 design again has two centrally-apertured discs 2, 3 and a washer stack here given the reference number 13. In the FIG. 3 embodiment, the washer stack 13 is accommodated in a recess or seating formed in a generally cylindrical body 4. The body 4 has a centrally-located passage extending therethrough. The body 4 and the washer stack 13 are sandwiched between the discs 2 and 3. The washer stack 13 is held in place in the body seating by an annular diaphragm 12 which is designed to exert a certain pressure or thrust on the peripheral annular surface of the washer stack, thus to compress the stack 13 when the device 1 is assembled and bolted together. The discs 2 and 3 are drawn towards one another, when the device is assembled, by means of a pair of bolts 5, 6 and nuts 7, 8, 9 and 10.

A seal, not shown, is provided between the diaphragm 12 and the body 4, and there are two further seals 17 and 18 for sealing joints between the body 4 and the adjacent ends of two pipes which are shown in dotted outline. A pair of flanged coupling members 14 and 15, of the type used as weld collars for refactory bricks, are welded to respective ends of the pipes. The flange of the coupling member 14 is sandwiched between the disc 3 and the diaphragm 12, a seal 18 being interposed between the flange and the diaphragm. The flange of member 15 is sandwiched between disc 2 and the body 4, a seal 17 being interposed between the flange and the body.

Each of the seals, as well as other parts of the assembly exposed to fluid flow, are made from materials resistant to chemical attack or corrosion by the fluids to be handled.

The degree to which the washer stack A or 13 is compressed, and the annular area over which compressive forces are applied to it, influences the amount by which the stack deforms when subjected to fluid pressure. The behaviour of the stack can be varied by substituting body tubes 4 (of FIG. 2) of different dimensions, and in FIG. 3 by substituting bodies 4 and diaphragms 12 of different dimensions.

In the diagram of FIG. 4, flow rates in cubic meters per hour have been plotted on the abscissa and the pressures in bars on the ordinate. Curve C is a graph illustrating the operation of an associated pump which has been assumed to be a semi-positive displacement pump whose delivery pressure is to be limited to around 5 bars. The curve representing ideal behaviour of a pressure limiting control device would follow the horizontal H. In the present instance, the designer must design the washer stack so that the graph representing its operation, that is to say the leakage graph of the pressure limiter, is the curve F, the tangent at the point P on which makes the smallest possible angle with the ideal horizontal curve H. The curve F should have the greatest possible radius of curvature in the neighbourhood of P and the curve F should, at zero pressure, be as close as possible to zero flow rate. Since there are several parameters available as already remarked, the desired results can be easily achieved employing the present invention. The resultant graph for the pump having the pressure limiter in accordance with the invention at the delivery side thereof will be represented by the curve R, which is derived from the curves C and F for a given pressure, from the equation abscissa of R + abscissa of F = the abscissa of C.

The above disclosure can be summarised as follows. The present invention comprises a pressure limiting device for protecting a fluid pressure circuit which includes a stack of elastomeric washers. Each of the washers has a slit through which fluid can bleed to reduce the fluid pressure below a critical value; the slits being normally closed and so prevent substantial fluid flow. The slits able to open to pass fluid when the pressure reaches a critical value at which the pressure distorts the stack of washers.

I claim:

1. A fluid pressure limiting device comprising: an elastically-operable obturator, said obturator including:

a plurality of valve members formed of elastomeric material and having at least one slit formed therein, said valve members being serially arranged and having opposed facing surfaces, said valve member slits defining normally closed pressure responsive valves; and a shim comprised of a material having a low coefficient of friction interposed between and in contact with the facing surfaces of each pair of adjacent elastomeric valve members, said shim having an opening formed therein, the opening in said shim defining a permanently open fluid flow passage, said shim determining the spacing between pairs of adjacent elastomeric valve members and facilitating relative sliding motion between contacting surfaces of said shim and valve members; and means for assembling said valve members and shim in a stack whereby a sliding action of facing surfaces of said valve members during pressure introduced distortion thereof may occur.

2. The pressure limiter of claim 1 wherein said valve members are in the form of flat surfaced washers and the slits in said washers of the stack are angularly oriented with respect to one another.

3. The pressure limiter of claim 2 wherein the spacer members have flat surfaces and the opening and slits in abutting spacer and valve members are angularly oriented with respect to one another.

4. The pressure limiter as in claim 3 wherein said spacer members are comprised of polytetrafluoroethylene.

5. A pressure limiter as in claim 4 wherein there are at least three elastomeric valve members respectively separated by two spacer members.

6. The pressure limiter of claim 5 wherein said assembling means includes:
rigid disc means;
means for assembling said disc means in spaced apart relationship; and
replaceable tubular housing means positionable between said rigid discs, said tubular housing means receiving said valve and spacer members and limiting the effective areas of the valve members exposed to the applied fluid pressure.

7. The pressure limiter of claim 1 wherein the opening in said spacer member is defined by a slit.

8. The pressure limiter of claim 7 wherein the slits in adjacent spacer members in the stack are angularly oriented with respect to one another.

9. The pressure limiter of claim 8 wherein the slits in abutting spacer and valve members of the stack are angularly oriented with respect to one another.

10. The pressure limiter of claim 1 wherein said assembling means includes:
rigid disc means;
means for assembling said disc means in spaced apart relationship; and
replaceable tubular housing means positionable between said rigid discs, said tubular housing means receiving said valve and spacer members and limiting the effective areas of the valve members exposed to the applied fluid pressure.

11. The pressure limiter as in claim 1 wherein said spacer members are comprised of polytetrafluoroethylene.

12. The pressure limiter of claim 11 wherein the spacer members have flat surfaces and the opening and slits in abutting spacer and valve members are angularly oriented with respect to one another.

* * * * *